(12) United States Patent
Lavrich

(10) Patent No.: US 10,907,879 B2
(45) Date of Patent: Feb. 2, 2021

(54) METHODS AND SYSTEMS FOR ENERGY EFFICIENT DEFROST OF A TRANSPORT CLIMATE CONTROL SYSTEM EVAPORATOR

(71) Applicant: THERMO KING CORPORATION, Minneapolis, MN (US)

(72) Inventor: Philip Lewis Lavrich, Mooresville, NC (US)

(73) Assignee: Thermo King Corporation, Minneapolis, MN (US)

( * ) Notice: Subject to any disclaimer, the term of this patent is extended or adjusted under 35 U.S.C. 154(b) by 109 days.

(21) Appl. No.: 16/236,905

(22) Filed: Dec. 31, 2018

(65) Prior Publication Data
US 2020/0208900 A1    Jul. 2, 2020

(51) Int. Cl.
  *F25D 21/00* (2006.01)
  *B60H 1/00* (2006.01)
  *B60H 1/32* (2006.01)

(52) U.S. Cl.
  CPC ....... *F25D 21/006* (2013.01); *B60H 1/00642* (2013.01); *B60H 2001/3252* (2013.01); *B60H 2001/3263* (2013.01); *F25D 2321/14* (2013.01)

(58) Field of Classification Search
  CPC .......... F25B 2347/02; F25B 2313/0211; F25B 47/02; F25B 2700/2111; F25B 2400/24;
  (Continued)

(56) References Cited

U.S. PATENT DOCUMENTS 2,526,032 A   10/1950  La Porte
2,554,848 A    5/1951  Warren
(Continued)

FOREIGN PATENT DOCUMENTS

EP      3492829     6/2019
WO   2016/205274   12/2016
WO   2018/020620    2/2018

OTHER PUBLICATIONS

European Search Report, issued in the corresponding European Patent Application No. 19219042.9, 6 pages, dated Jun. 12, 2020.
(Continued)

*Primary Examiner* — Marc E Norman
*Assistant Examiner* — Schyler S Sanks
(74) *Attorney, Agent, or Firm* — Hamre, Schumann, Mueller & Larson, P.C.

(57) ABSTRACT

A method for directing thermal energy to an evaporator of a transport climate control circuit of a transport climate control system is provided. The method includes a controller determining whether the climate control circuit is operating in a start-stop cooling mode. Also, the method includes the controller determining a thermal energy charge of the thermal storage reservoir when the climate control circuit is operating in the start-stop cooling mode. The method also includes determining whether the thermal energy charge is greater than a charge threshold. Further, the method includes determining whether the climate control circuit is operating in a stop portion of the start-stop cooling mode when the thermal energy charge is greater than the charge threshold. The method further includes transferring thermal energy from the thermal storage reservoir to an evaporator when the climate control circuit is operating in the stop portion of the start-stop cooling mode.

18 Claims, 4 Drawing Sheets

(58) Field of Classification Search
CPC .............. F25B 2400/053; B60H 1/005; B60H 1/00499; B60H 1/00492; B60H 1/00364; B60H 1/00014; B60H 1/00642; F25D 3/005; F25D 3/00; F25D 21/006; F25D 11/003

See application file for complete search history.

(56) References Cited

U.S. PATENT DOCUMENTS

| | | | |
|---|---|---|---|
| 3,343,375 A | 9/1967 | Quick | |
| 3,978,684 A | 9/1976 | Taylor | |
| 4,102,151 A | 7/1978 | Kramer et al. | |
| 4,420,943 A | 12/1983 | Clawson | |
| 4,646,537 A * | 3/1987 | Crawford | F24D 5/12 62/238.6 |
| 4,646,539 A | 3/1987 | Taylor | |
| 4,720,980 A | 1/1988 | Howland | |
| 4,798,059 A | 1/1989 | Morita | |
| 5,269,151 A * | 12/1993 | Dinh | F25B 47/022 62/278 |
| 5,755,104 A * | 5/1998 | Rafalovich | F25B 13/00 62/205 |
| 8,516,837 B2 | 8/2013 | Swarup et al. | |
| 9,513,046 B2 | 12/2016 | Ramirez et al. | |
| 2013/0312437 A1 | 12/2013 | Davies et al. | |
| 2014/0130532 A1 | 5/2014 | Chen | |
| 2016/0161162 A1 | 6/2016 | Saito et al. | |
| 2017/0151859 A1* | 6/2017 | Dykes | B60H 1/00014 |
| 2018/0195788 A1 | 7/2018 | Nolte | |
| 2018/0195789 A1 | 7/2018 | Swab | |
| 2020/0049392 A1* | 2/2020 | Tanaka | F25B 47/025 |

OTHER PUBLICATIONS

Varun Thangamani, "A Novel Low-Energy Defrost Process for the Frozen Food Chain", The Institute of Refrigeration, Apr. 3, 2014, 12 pages.

Varun Thangamani, "A Low Carbon Defrost System", Conference Paper, Jul. 2014, 10 pages.

Ian Wilson, "The Evolution of CO2 Refrigeration System", Strathbrook Industrial Services, May 16, 2016, 38 pages.

"Design Show Brochure", School of Engineering, University of St. Thomas, 2018, 36 pages.

* cited by examiner

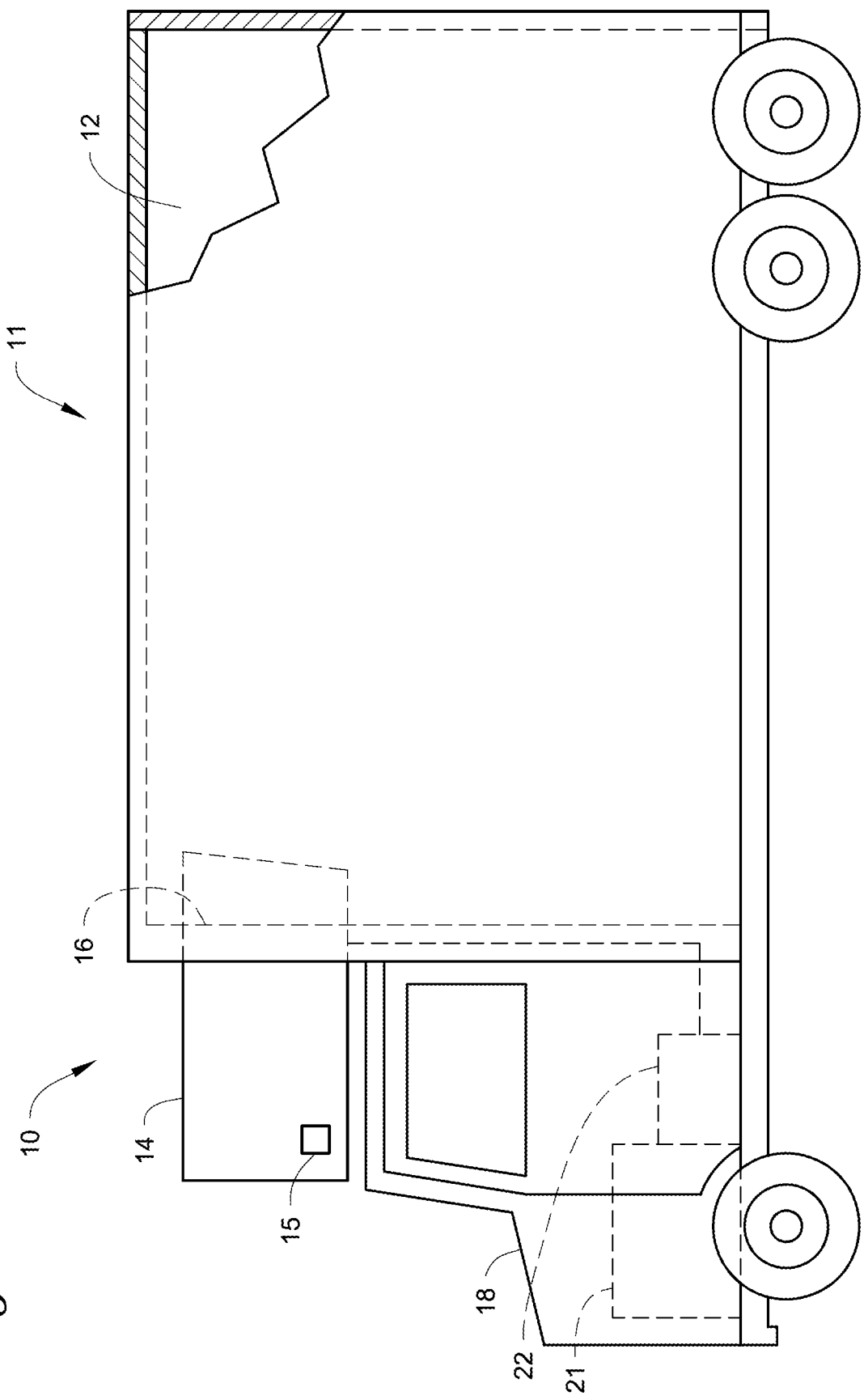

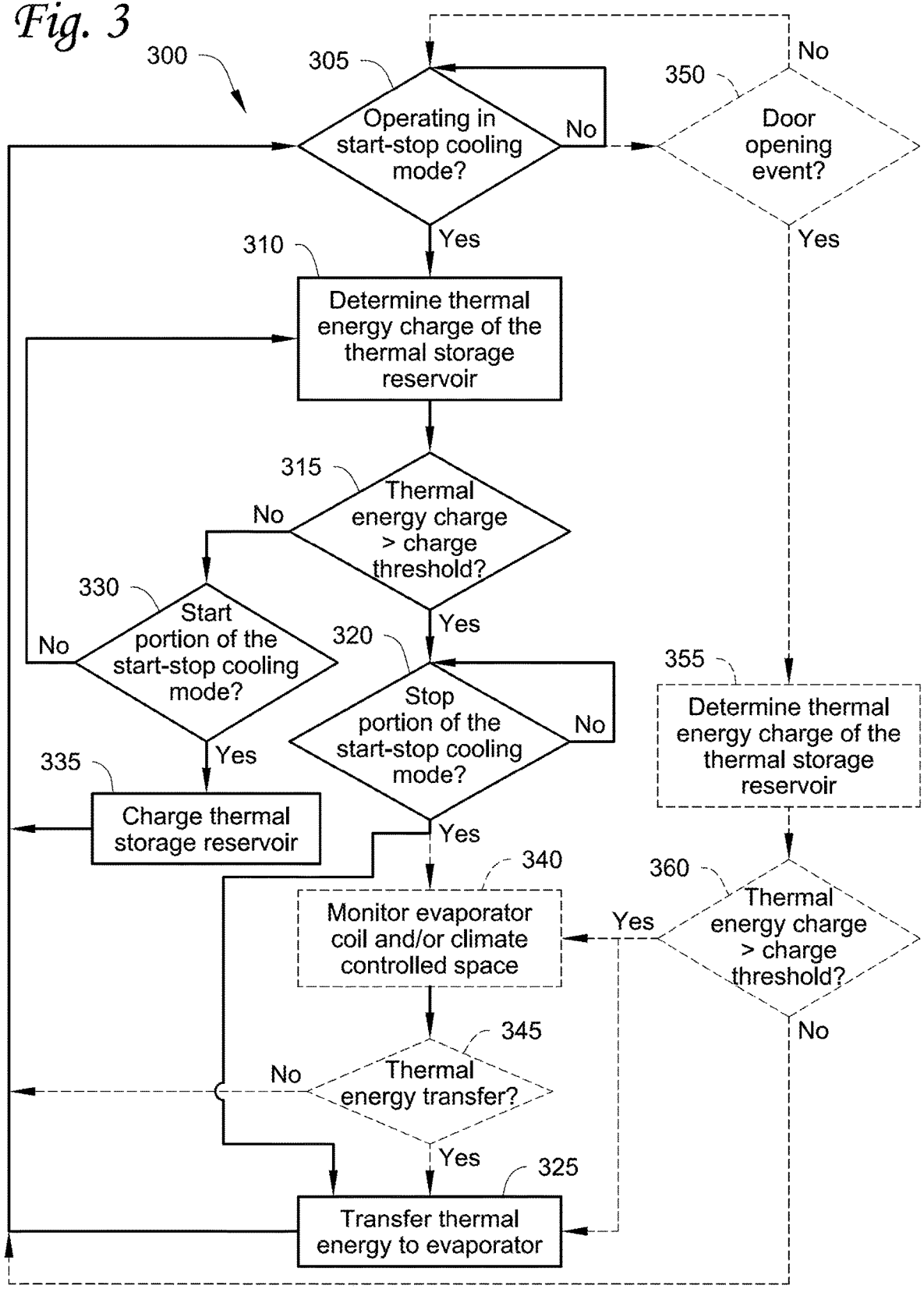

METHODS AND SYSTEMS FOR ENERGY EFFICIENT DEFROST OF A TRANSPORT CLIMATE CONTROL SYSTEM EVAPORATOR

FIELD

This disclosure relates generally to a transport climate control system. More specifically, the disclosure relates to methods and systems for providing energy efficient defrosting of a transport climate control system evaporator.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within an internal space or cargo space of a transport unit (e.g., a truck, a container (such as a container on a flat car, an intermodal container, etc.), a box car, a semi-tractor, a bus, or other similar transport unit). The TRS can maintain environmental condition(s) of the internal space to maintain cargo (e.g., produce, frozen foods, pharmaceuticals, etc.) In some embodiments, the transport unit can include a HVAC system to control a climate within a passenger space of the vehicle.

SUMMARY

This disclosure relates generally to a transport climate control system. More specifically, the disclosure relates to methods and systems for providing energy efficient defrosting of a transport climate control system evaporator.

The embodiments provided herein can provide energy efficient defrosting of an evaporator coil of a transport climate control system. Also, the embodiments provided herein can provide passive defrost of an evaporator coil of a transport climate control system. In particular, the embodiments provided herein can store heat during a start portion of a start-stop cooling mode and provide defrost to the evaporator coil during a stop portion of the start-stop cooling mode. By defrosting the evaporator coil while the transport climate control system is providing cooling can improve cooling efficiency of the transport climate control system as a frosted evaporator coil can lower capacity and efficiency of the transport climate control system during cooling. Also, defrosting the evaporator coil while the transport climate control system is providing cooling can prevent chunks of ice from forming on the evaporator coil that would require substantially more energy to defrost. Accordingly, the embodiments described herein can provide more frequent defrosting of the evaporator coil as opposed to a separate defrost operation mode of the transport climate control system and thereby reduce the energy required for defrosting the evaporator coil and/or reducing the total energy cost of the transport climate control system.

In some embodiments, the transport climate control system can include a thermal storage reservoir that can capture thermal energy while a transport climate control circuit (e.g., a refrigeration circuit, a HVAC circuit, etc.) of the transport climate control system is cooling a climate controlled space. The thermal storage reservoir can then provide the captured thermal energy when required to defrost the evaporator coil. Accordingly, no new energy would be required by the transport climate control system to generate additional heat for defrosting the evaporator coil. The transport climate control system can then recharge the thermal storage reservoir during normal cooling operation. The thermal storage reservoir can be recharged using rejected/waste heat stored in a working fluid passing through the transport climate control circuit. In some embodiments, the recharge process can improve efficiency of the start-stop cooling mode and thus provide additional energy reduction of the transport climate control system. For example, the recharge process can provide additional sub cooling to the working fluid and/or a desuperheater to a condenser of the transport climate control circuit.

In some embodiments, the thermal storage reservoir can be directly connected to the transport climate control circuit such that a working fluid having thermal energy and flowing through the transport climate control circuit can be stored within the thermal storage reservoir.

In other embodiments, the thermal storage reservoir can be indirectly connected to the transport climate control circuit such that a heat exchange occurs between working fluid having thermal energy and flowing through the transport climate control circuit and a material stored in the thermal storage reservoir. For example, the thermal storage reservoir may be a tank filled with a heat transfer fluid (e.g., brine, any phase-changing fluid ($CO_2$, HFC refrigerant, etc.) or high thermal capacity fluid, etc.). that stores heat captured from the working fluid. In some embodiments, the thermal storage reservoir can include a heat pipe using heat transfer fluid with tubes in a coil to add heat for defrost. In another example, the thermal storage reservoir can include a phase change material (e.g., eutectic) that stores heat captured from the working fluid. It will be appreciated that a phase change material is not required and or any type of material that can efficiently store heat therein can be used.

The embodiments described herein can reduce total energy use of the transport climate control system and provide defrost to an evaporator coil of the transport climate control system with minimal net energy consumption. Further, the embodiments described herein can prevent the need to generate additional heat for defrosting an evaporator and thereby prevent additional energy usage needed to generate the additional heat. Moreover, the embodiments described herein can reduce the generation of waste heat that can be generated when heat is added to the evaporator coil using, for example, hot gas from a reverse cycle or an electric heater in which as low as 30% of the generated heat is used for defrosting the evaporator coil and up to 70% of the generated heat is lost to the climate controlled space. Accordingly, the embodiments described herein can be used in battery powered, hybrid, and or electric transport climate control systems where maximizing operation of the transport climate control system and minimizing energy (e.g., battery) usage while in transit can be important.

The embodiments described herein can remove frost buildup on a transport climate control system evaporator coil that can occur, for example, during hot and/or humid ambient conditions outside of a climate controlled space (e.g., an internal or cargo space of a transport unit, a passenger space of a vehicle, etc.) being conditioned by the transport climate control system. It will be appreciated that frost buildup on the evaporator coil that is not periodically removed can reduce the cooling capacity of the transport climate control system and can lead to damage to the transport climate control system and increased power consumption of the transport climate control system.

In one embodiment, a method for directing thermal energy to an evaporator of a transport climate control circuit of a transport climate control system that provides climate control to a climate controlled space of a transport unit while in transit is provided. The transport climate control circuit includes a compressor, a condenser, an expansion device, an evaporator and a thermal storage reservoir. The method includes a controller of the transport climate control system determining whether the climate control circuit is operating in a start-stop cooling mode. Also, the method includes the controller determining a thermal energy charge of the thermal storage reservoir when the climate control circuit is operating in the start-stop cooling mode. The method also includes determining whether the thermal energy charge is greater than a charge threshold. Further, the method includes determining whether the climate control circuit is operating in a stop portion of the start-stop cooling mode when the thermal energy charge is greater than the charge threshold. The method further includes transferring thermal energy from the thermal storage reservoir to the evaporator when the climate control circuit is operating in the stop portion of the start-stop cooling mode.

In another embodiment, a transport climate control system that provides climate control to a climate controlled space of a transport unit while in transit is provided. The transport climate control system includes a transport climate control circuit and a controller. The transport climate control circuit includes a compressor, a condenser, an expansion device, an evaporator and a thermal storage reservoir. The compressor compresses a working fluid passing through the transport climate control circuit. The condenser cools and condenses the working fluid. The expansion device controls the amount of working fluid directed from the condenser to the evaporator. The evaporator absorbs heat from the climate controlled space and evaporates the working fluid. The thermal storage reservoir stores thermal energy and is configured to direct the thermal energy to the evaporator. The controller is configured to control the transport climate control circuit. Also, the controller is configured to determine whether the climate control circuit is operating in a start-stop cooling mode, determine a thermal energy charge of the thermal storage reservoir when the climate control circuit is operating in the start-stop cooling mode, determine whether the thermal energy charge is greater than a charge threshold, determine whether the climate control circuit is operating in a stop portion of the start-stop cooling mode when the thermal energy charge is greater than the charge threshold, and instruct the transport climate control circuit to transfer thermal energy from the thermal storage reservoir to the evaporator when the climate control circuit is operating in the stop portion of the start-stop cooling mode.

BRIEF DESCRIPTION OF THE DRAWINGS

References are made to the accompanying drawings that form a part of this disclosure and which illustrate embodiments in which the systems and methods described in this specification can be practiced.

FIG. 1A illustrates a side view of a truck with a front wall mounted vehicle powered transport refrigeration unit, according to one embodiment.

FIG. 3 illustrates a flowchart a method for providing thermal energy to the evaporator of the climate control circuit shown in FIG. 2, according to one embodiment, according to one embodiment.

Like reference numbers represent like parts throughout.

DETAILED DESCRIPTION

Figure 1B:
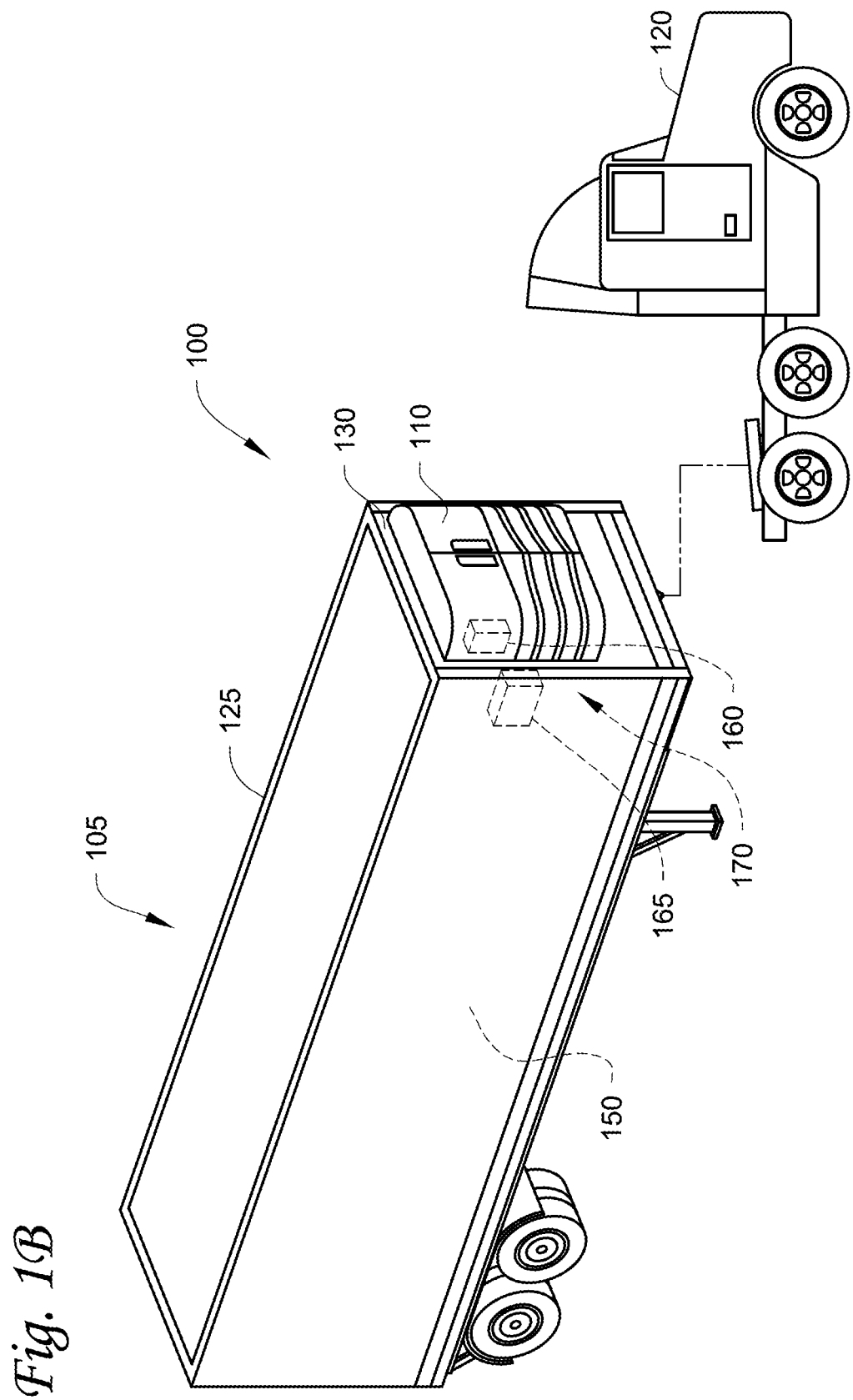
FIG. 1B illustrates a perspective view of a refrigerated transport unit attached to a tractor, according to one embodiment.

This disclosure relates generally to a transport climate control system. More specifically, the disclosure relates to methods and systems for providing energy efficient defrosting of a transport climate control system evaporator.

FIG. 1A depicts a temperature-controlled straight truck 11 that includes a climate controlled space 12 for carrying cargo and a climate control system 10 for providing climate control to the climate controlled space 12. The climate control system 10 includes a transport refrigeration unit (TRU) 14 is mounted to a front wall 16 of the climate controlled space 12. The TRU 14 includes a refrigeration circuit that connects, for example, a compressor, a condenser, an evaporator and an expansion valve to provide conditioned air within the climate controlled space 12. The refrigeration circuit can also include a thermal storage reservoir for capturing thermal energy from the refrigeration circuit while the refrigeration circuit is providing cooling to the climate controlled space 12. The thermal storage reservoir can then provide the captured thermal energy when required to defrost the evaporator.

The climate control system 10 also includes a programmable climate controller 15 and one or more sensors (not shown) that are configured to measure one or more parameters of the climate control system 10 and communicate parameter data to the climate controller 15. The climate controller 15 may comprise a single integrated control unit or may comprise a distributed network of climate controller elements. The number of distributed control elements in a given network can depend upon the particular application of the principles described herein. The climate controller 15 is configured to control operation of the climate control system 10 including the refrigeration circuit.

The truck 11 further includes a vehicle power bay 18, which houses a prime mover 21, such as a combustion engine (e.g., diesel engine, etc.), that provides power to move the truck 11 and to operate the TRU 14. In some embodiments, the prime mover 21 can work in combination with an optional machine 22 (e.g., an alternator) to operate the TRU 14. In some embodiments, the truck 11 can be a hybrid vehicle that is powered by the prime mover 21 in combination with a battery power source or can be an electrically driven truck in which the prime mover 21 is replaced with an electric power source (e.g., a battery power source).

While FIG. 1A illustrates a temperature-controlled straight truck 11, it will be appreciated that the embodiments described herein can also apply to any other type of transport unit including, but not limited to, a container (such as a container on a flat car, an intermodal container, etc.), a box car, or other similar transport unit. container, etc.), a box car, or other similar transport unit.

FIG. 1B illustrates one embodiment of a refrigerated transport unit 105 attached to a tractor 110. The refrigerated transport unit 105 includes a climate control system 100 for a transport unit 125. The tractor 120 is attached to and is configured to tow the transport unit 125. The transport unit 125 shown in FIG. 1B is a trailer. It will be appreciated that the embodiments described herein are not limited to tractor and trailer units, but can apply to any type of transport unit (e.g., a container on a flat car, an intermodal container, etc.), a truck, a box car, or other similar transport unit. The transport unit 125 can include one or more doors (not shown) that are movable between an open position and a closed position to selectively allow access to a climate controlled space (e.g., internal or cargo space) 150.

The climate control system 100 includes a climate control unit (CCU) 110 that provides environmental control (e.g. temperature, humidity, air quality, etc.) within the climate controlled space 150 of the transport unit 125. The climate control system 100 also includes a programmable climate controller 170 and one or more sensors (not shown) that are configured to measure one or more parameters of the climate control system 100 and communicate parameter data to the climate controller 170.

The CCU 110 is disposed on a front wall 130 of the transport unit 125. In other embodiments, it will be appreciated that the CCU 110 can be disposed, for example, on a rooftop or another wall of the transport unit 125. The CCU 110 includes a refrigeration circuit that connects, for example, a compressor, a condenser, an evaporator and an expansion valve to provide conditioned air within the climate controlled space 150. The refrigeration circuit can also include a thermal storage reservoir for capturing thermal energy from the refrigeration circuit while the refrigeration circuit is providing cooling to the climate controlled space 150. The thermal storage reservoir can then provide the captured thermal energy when required to defrost the evaporator.

The climate controller 170 may comprise a single integrated control unit 160 or may comprise a distributed network of climate controller elements 160, 165. The number of distributed control elements in a given network can depend upon the particular application of the principles described herein. The climate controller 170 is configured to control operation of the climate control system 100 including the refrigeration circuit.

Figure 2:
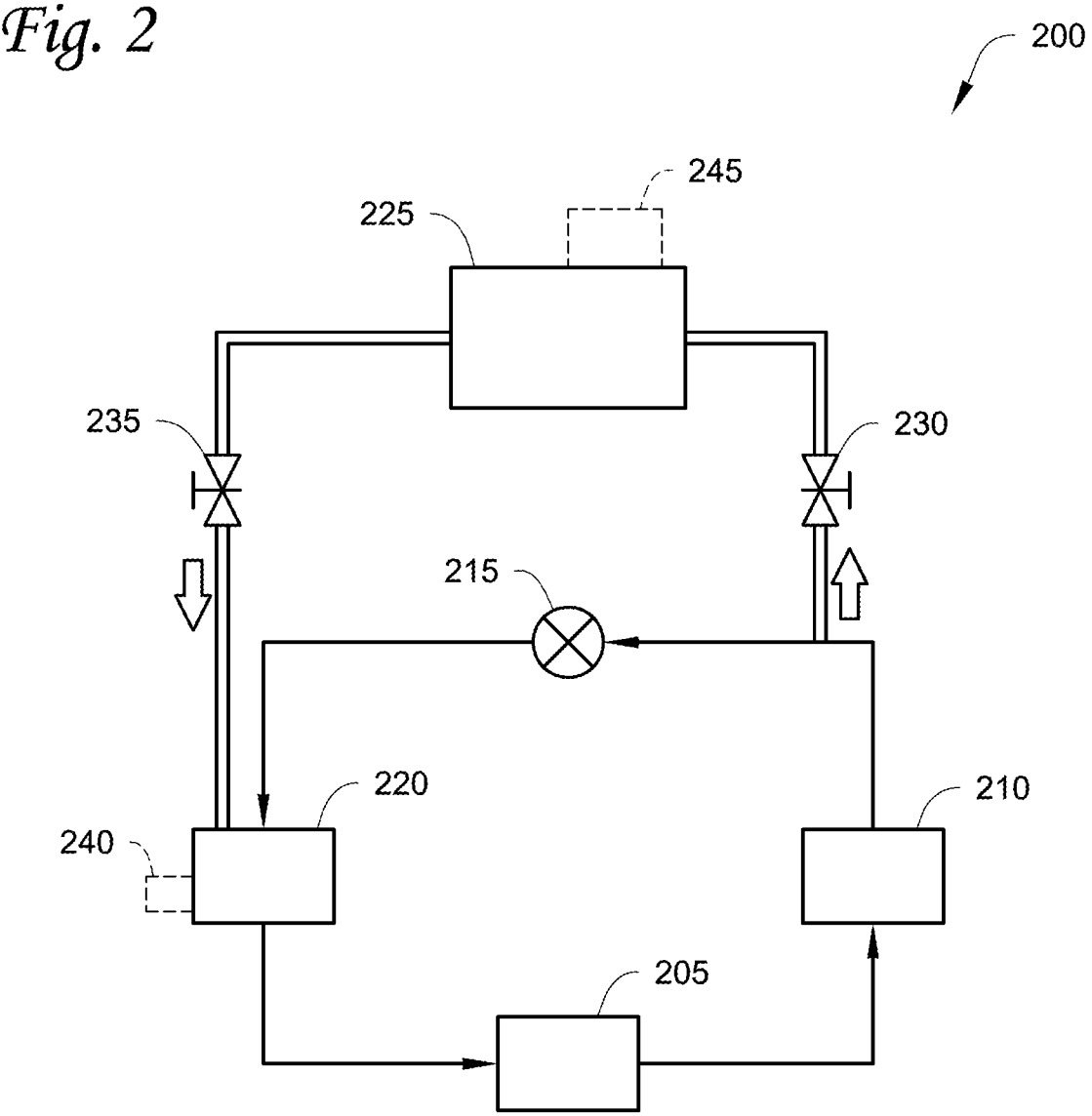
FIG. 2 illustrates a block diagram of a climate control circuit, according to one embodiment.

FIG. 2 illustrates a block diagram of a climate control circuit 200, according to one embodiment. The climate control circuit 200 can be, for example, a HVAC circuit that can be used to provide climate control within a passenger space of a vehicle (e.g., the vehicle 10 shown in FIG. 1A), a refrigeration circuit that can be used to provide climate control within an internal space or cargo space of a refrigerated transport unit (e.g., the refrigerated transport unit 105 shown in FIG. 1B), etc.

The climate control circuit 200 includes a compressor 205, a condenser 210, an expansion device 215, an evaporator 220 and a thermal storage reservoir 225. The climate control circuit 200 also includes a heat capture valve 230 and a thermal energy valve 235. Optionally, the climate control circuit 200 can also include a heating device 240.

The compressor 205 can be a digital scroll compressor, a reciprocating compressor, a screw compressor, a positive displacement compressor, a centrifugal compressor, or other suitable type of compressor for compressing a working fluid. A controller (e.g., the climate controller 80, 170 shown in FIGS. 1A and 1B) is configured to control the climate control circuit 200 to operate in a plurality of different operation modes including, for example, a continuous cooling mode, a start-stop cooling mode, a heating mode, etc.

Of particular note, in the continuous cooling mode, the controller is configured to instruct the compressor 205 to continuously compress the working fluid until the temperature within the climate controlled space reaches a desired setpoint temperature. In the start-stop cooling mode, the controller is configured to instruct the compressor 205 to operate in a periodic cycle in which during each cycle the compressor 205 is configured to compress the working fluid for a first period of time and then the compressor 205 is configured to stop compressing the working fluid for a second period of time. The compressor 205 will continue to cycle between compressing the working fluid and not compressing the working fluid until the temperature within the climate controlled space reaches the desired setpoint temperature. In some embodiments, the compressor 205 is configured to compress the working fluid and direct the compressed working fluid from the compressor 205 to the condenser 210 during the start portion and configured to not compress working fluid during the stop portion. In some embodiments, during the stop portion of the start-stop cooling mode fan(s) of the condenser 210 and the evaporator 220 are turned off and are not operating.

The compressor 205 is configured to compress a working fluid (e.g., refrigerant) and direct the working fluid through the climate control circuit 200 in order to provide temperature control within a climate controlled space (e.g., the climate controlled space 20, 150 shown in FIGS. 1A and 1B). In particular, the compressor 205 is configured to direct the compressed working fluid that is a gas to the condenser 210.

The condenser 210 can include a condenser coil (not shown) and one or more condenser fans. The condenser 210 is configured to allow the working fluid, received from the compressor 205, to transform from a gas to a liquid by releasing heat absorbed by the working fluid into the ambient environment outside of the climate controlled space. That is, the condenser 210 is configured to cool and condense the working fluid. It will be appreciated that the liquid working fluid passing through the condenser 210 still retains thermal energy that can be stored, for example, in the thermal storage reservoir 225. When the climate control circuit 200 is providing cooling to the climate controlled space, this thermal energy stored within the liquid working fluid becomes rejected/wasted as the working fluid passes from the condenser 210 to the expansion device 215, to the evaporator 220 and then back to the compressor 205. The condenser 210 is configured to direct the liquid working fluid to the expansion device 215. The condenser 210 can also be configured to direct at least a portion of the liquid working fluid to the thermal storage reservoir 225 when the heat capture valve 230 is open.

The expansion device 215 is configured to receive the working fluid in the form of a liquid from the condenser 210 and is configured to restrict the flow of the working fluid in the form of a gas to the evaporator 220. In some embodiments, the expansion device 215 can be an expansion valve. The gaseous working fluid is directed by the expansion device 215 to the evaporator 220.

The evaporator 220 can include an evaporator coil (not shown) and one or more evaporator fans. The evaporator 220 is configured to allow the working fluid, received from the expansion device 215, to evaporate from a liquid to a gas by absorbing heat from the climate controlled space and thereby provide cooling to the climate controlled space. The evaporator 220 is also in thermal communication with the thermal storage reservoir 225 via the thermal energy valve 235. In particular, the evaporator 220 can direct a thermal energy fluid to the thermal storage reservoir 225. The thermal energy fluid can retrieve thermal energy stored in the thermal storage reservoir 225 and the thermal storage reservoir 225 can then direct the thermal energy fluid with the thermal energy back to the evaporator 220 to provide defrosting of the evaporator coil of the evaporator 220. In some embodiments, the thermal energy fluid can be the working fluid passing through the climate control circuit 200. In other embodiments, the thermal energy fluid can be separate and/or different from the working fluid passing through the climate control circuit 200.

When the heat capture valve 230 is open, the thermal storage reservoir 225 is configured to capture and store thermal energy from the liquid working fluid exiting the condenser 210. The liquid working fluid having released thermal energy to the thermal storage reservoir 225 can then be returned to an inlet of the expansion device 215. Accordingly, the thermal storage reservoir 225 can provide additional sub cooling and/or a desuperheater to the working fluid passing from the condenser 210 to the expansion device 215. When the thermal energy valve 235 is open, the thermal storage reservoir 225 is configured to provide heat to defrost the evaporator coil of the evaporator 220.

The thermal storage reservoir 225 is configured to store thermal energy that can be used to defrost the evaporator coil of the evaporator 220. Optionally, the climate control circuit 200 can also include an optional heating element 245 that can provide thermal energy to the thermal storage reservoir 225 when, for example, heat capture from the working fluid passing between the condenser 210 to the expansion device 215 is not sufficient to charge the thermal storage reservoir 225. Accordingly, the optional heating element 245 can also provide extended runtime for defrosting the evaporator 220. This can allow for increased flexibility in defrost operation such as during frequent door openings of the climate controlled space (e.g., also referred to as door opening events). In some embodiments, the optional heating element 245 can be an electric heating device. Also, in some embodiments, the thermal storage reservoir 225 (with optionally the heating element 245) can provide thermal energy to the evaporator 220 in order to provide heating to the climate controlled space.

In some embodiments, the thermal storage reservoir 225 can be directly connected to the condenser 225 and/or the evaporator 220 such that a working fluid having thermal energy and flowing through the transport climate control circuit 200 can be stored within the thermal storage reservoir 225.

In other embodiments, the thermal storage reservoir 225 can be indirectly connected to the condenser 210 and/or the evaporator 220 such that a heat exchange occurs between the working fluid having thermal energy and flowing through the transport climate control circuit 200 and a material stored in the thermal storage reservoir. For example, the thermal storage reservoir 225 may be a tank filled with a heat transfer fluid (e.g., brine) that stores heat captured from the working fluid. In some embodiments, the tank may be surrounded by an insulating material such as, for example, glycol. In another example, the thermal storage reservoir 225 can include a phase change material (e.g., eutectic) that stores heat captured from the working fluid.

The heat capture valve 230 and the thermal energy valve 235 can be controlled, for example, by the controller. It will be appreciated that the heat capture valve 230 can include two separate valves with one valve allowing liquid working fluid from the condenser 210 to travel to the thermal storage reservoir 225 and the other valve allowing the liquid working fluid from the thermal storage reservoir 225 to travel to the inlet of the expansion device 215. Similarly, it will be appreciated that the thermal energy valve 235 can include two separate valves with one valve allowing the thermal energy fluid from the evaporator 220 to travel to the thermal storage reservoir 225 and the other valve allowing the thermal energy fluid from the thermal storage reservoir 225 to travel to the evaporator 220. In some embodiments, the heat capture valve 230 and the thermal energy valve 235 can be solenoid valves.

In some embodiments, the climate control circuit 200 can further include one or more pumps (not shown) for directing the working fluid from the condenser 210 to the thermal storage reservoir 225, directing the working fluid from the thermal storage reservoir 225 to the inlet of the expansion device 215, directing the thermal energy fluid from the evaporator 220 to the thermal storage reservoir 225, and/or directing the thermal energy fluid from the thermal storage reservoir 225 to the evaporator 220. In some embodiments, working fluid can directed from the condenser 210 to the thermal storage reservoir 225, working fluid can be directed from the thermal storage reservoir 225 to the inlet of the expansion device 215, the thermal energy fluid can be directed from the evaporator 220 to the thermal storage reservoir 225, and/or the thermal energy fluid can be directed from the thermal storage reservoir 225 to the evaporator 220 based on pressure differences within the climate control circuit 200.

In some embodiments, the climate control circuit 200 can also include the optional heating device 240 for providing additional defrosting of the evaporator coil of the evaporator 220. In some embodiments, the optional heating device 240 can be an electric heater. The optional heating device 240 can provide supplemental defrosting when heat provided by the thermal storage reservoir 225 is unavailable and/or insufficient to defrost the evaporator coil.

One embodiment for operating the climate control circuit 200 is described below with respect to FIG. 3.

FIG. 3 illustrates a flowchart a method 300 for providing thermal energy to the evaporator 220 of the climate control circuit 200 shown in FIG. 2, according to one embodiment.

The method 300 begins at 305 whereby a controller (e.g., the climate controller 80, 170 shown in FIGS. 1A and 1B) determines whether the climate control circuit 200 is operating in a start-stop cooling mode. When the controller determines that the climate control circuit 200 is operating in a start-stop cooling mode, the method 300 proceeds to 310. When the controller determines that the climate control circuit 200 is not operating in a start-stop cooling mode, the method 300 proceeds to 350.

At 310, the controller determines a thermal energy charge of the thermal storage reservoir 225. In some embodiments, a temperature sensor (e.g., thermal probe) can be used to determine the thermal energy charge of the thermal storage reservoir 225. The method 300 then proceeds to 315.

At 315, the controller determines whether the thermal energy charge determined at 310 is greater than a charge threshold. The charge threshold can be a predefined value based on a thermal energy storage capacity of the thermal storage reservoir 225 and/or an amount of thermal energy required to defrost the evaporator coil of the evaporator 220. That is, the charge threshold is a value indicating whether there is sufficient thermal energy charge in the thermal storage reservoir 225 to defrost the evaporator coil of the evaporator 220. In some embodiments, the charge threshold can be set to a value to ensure that the thermal storage reservoir 225 has sufficient thermal energy to completely defrost the evaporator coil of the evaporator 220. When the controller determines that the thermal energy charge of the thermal storage reservoir 225 is greater than the charge threshold, the method 300 proceeds to 320. When the controller determines that the thermal energy charge of the thermal storage reservoir 225 is not greater than the charge threshold, the method 300 proceeds to 340.

At 320, the controller determines whether the climate control circuit 200 is operating in a stop portion of the start-stop cooling mode. The controller can determine whether the climate control circuit 200 is operating in a stop portion of the start-stop cooling mode based on monitoring operation of the compressor 205. In some embodiments, when the climate control circuit 200 is operating in the stop portion of the start-stop cooling mode, fan(s) of the condenser 210 and the evaporator 220 will also be stopped. When the controller determines that the climate control circuit 200 is operating in the stop portion of the start-stop cooling mode, the method 300 proceeds to 325 or optionally 340. When the controller determines that the climate control circuit 200 is not operating in the stop portion of the start-stop cooling mode, the method 300 proceeds back to 320.

At 325, the controller instructs the thermal energy valve 235 to open to allow thermal energy stored in the thermal storage reservoir to be transferred to the evaporator 220 (e.g., the evaporator coil of the evaporator 220). The thermal energy transferred to the evaporator 220 can be used for defrosting the evaporator coil. Accordingly, the climate control circuit 200 can provide periodic defrosting of the evaporator 220 while the climate control circuit 200 is operating in a cooling mode. In some embodiments, the thermal energy transferred to the evaporator 220 can be used for providing heat to the climate controlled space. The method 300 then proceeds back to 305.

At 335, the controller determines whether the climate control circuit 200 is operating in a start portion of the start-stop cooling mode. In some embodiments, the compressor 205 is configured to compress the working fluid and direct the compressed working fluid to the condenser 210 during the start portion. The controller can determine whether the climate control circuit 200 is operating in a start portion of the start-stop cooling mode based on monitoring operation of the compressor 205. When the controller determines that the climate control circuit 200 is operating in the start portion of the start-stop cooling mode, the method 300 proceeds to 325 or optionally 340. When the controller determines that the climate control circuit 200 is not operating in the stop portion of the start-stop cooling mode, the method 300 proceeds back to 320.

At optional 340, the controller monitors the evaporator coil of the evaporator 220 and/or the climate controlled space. In some embodiments, monitoring the evaporator coil can include monitoring a temperature difference across the evaporator coil. For example, in one embodiment, one or more temperature sensors can be provided on the evaporator coil that provide evaporator coil temperature data across the evaporator coil. In another embodiment, one or more pressure sensors can be provided for providing pressure data across the evaporator coil. In some embodiments, monitoring the climate controlled space can include monitoring door openings of doors that access the climate controlled space (also referred to as door opening events), monitoring a temperature within the climate controlled space, etc. The method 300 then proceeds to optional 345.

At optional 345, the controller determines whether thermal energy should be transferred to the evaporator 220 based on the data monitored at optional 340. In some embodiments, this includes the controller determining whether there has been a frost buildup on an evaporator coil of the evaporator 220. The controller can determine whether there has been a frost buildup on the evaporator coil based on temperature readings obtained at optional 340 across the evaporator coil. The controller can also determine whether there has been a frost buildup on the evaporator coil based on pressure readings obtained at 340 through the evaporator coil of the evaporator 220. In some embodiments, the controller can determine that thermal energy should be transferred to the evaporator 220 when the data monitored at optional 340 indicates a minimum amount of frost buildup (e.g, a minimal temperature change across the evaporator coil and/or a minimal pressure drop across the evaporator coil). Accordingly, the method 300 can provide energy efficient passive defrost of the evaporator coil of the evaporator 220.

In some embodiments, this can also include the controller determining whether heating to the climate controlled space is desired. Heating the climate controlled space can be desired, for example, when there have been frequent door opening events, based on a temperature drop from a desired setpoint temperature within the climate controlled space, etc.

When the controller determines that thermal energy should be transferred to the evaporator 220, the method 300 then proceeds to 325. When the controller that thermal energy should not be transferred to the evaporator 220, the method proceeds back to 305.

At optional 350, the controller determines whether a door opening event has occurred. In some embodiments, the door opening event indicates that a door having access to the climate controlled space has been opened. It will be appreciated that in some embodiments, when a door having access to the climate controlled space has been opened, the climate control circuit 200 is configured to automatically stop cooling until the door has been closed. Once the controller determines that the door has been closed, the climate control circuit 200 will resume cooling of the climate controlled space. When the controller determines that a door opening event has occurred, the method 300 proceeds to optional 355. When the controller determines that a door opening event has not occurred, the method 300 proceeds back to 305.

At optional 355, the controller determines a thermal energy charge of the thermal storage reservoir 225. The method 300 then proceeds to optional 360.

At optional 360, the controller determines whether the thermal energy charge determined at optional 355 is greater than a charge threshold. The charge threshold can be a predefined value based on a thermal energy storage capacity of the thermal storage reservoir 225 and/or an amount of thermal energy required to defrost the evaporator coil of the evaporator 220. That is, the charge threshold is a value indicating whether there is sufficient thermal energy charge in the thermal storage reservoir 225 to defrost the evaporator coil of the evaporator 220. In some embodiments, the charge threshold can be set to a value to ensure that the thermal storage reservoir 225 has sufficient thermal energy to completely defrost the evaporator coil of the evaporator 220. When the controller determines that the thermal energy charge of the thermal storage reservoir 225 is greater than the charge threshold, the method 300 can proceed to 360 or to optional 340. When the controller determines that the thermal energy charge of the thermal storage reservoir 225 is not greater than the charge threshold, the method 300 proceeds to 305.

Accordingly, the method 300 can provide passive energy efficient defrost of the evaporator 220 and/or heating to the climate controlled space. Also, the method 300 can prevent chunks of ice from forming on the evaporator coil that would require substantially more energy to defrost than passive energy efficient defrost provided in the method 300. Reducing total energy consumption by the transport climate control system can be important particularly for those transport climate control systems that use stored energy to operate. This is because, for example, the energy storage can be expensive, heavy, and/or take valuable space of the transport vehicle. An advantage of these embodiments is that the transport climate control system can provide defrost to the evaporator coil without requiring additional energy to generate heat to remove any frost buildup. Accordingly, transport climate control systems that operate using stored energy can be operated more efficiently by preventing the need for a separate defrost mode and/or additional energy to operate the separate defrost mode.

Aspects:

It is to be appreciated that any of aspects 1-9 can be combined with any of aspects 10-16.

Aspect 1. A method for directing thermal energy to an evaporator of a transport climate control circuit of a transport climate control system that provides climate control to a climate controlled space of a transport unit while in transit, the transport climate control circuit including a compressor, a condenser, an expansion device, an evaporator and a thermal storage reservoir, the method comprising:

a controller of the transport climate control system determining whether the climate control circuit is operating in a start-stop cooling mode;

the controller determining a thermal energy charge of the thermal storage reservoir when the climate control circuit is operating in the start-stop cooling mode;

determining whether the thermal energy charge is greater than a charge threshold;

determining whether the climate control circuit is operating in a stop portion of the start-stop cooling mode when the thermal energy charge is greater than the charge threshold; and transferring thermal energy from the thermal storage reservoir to the evaporator when the climate control circuit is operating in the stop portion of the start-stop cooling mode.

Aspect 2. The method of aspect 1, further comprising charging the thermal storage reservoir when the climate control circuit is operating in the start portion of the start-stop cooling mode.

Aspect 3. The method of aspect 2, wherein charging the thermal storage reservoir includes opening a heat capture valve, redirecting liquid working fluid travelling from the condenser to the expansion device towards the thermal storage reservoir, capturing and storing thermal energy from the liquid working fluid within the thermal storage reservoir, and directing the liquid working fluid from the thermal storage reservoir to the expansion device.

Aspect 4. The method of any one of aspects 1-3, wherein transferring thermal energy from the thermal storage reservoir to the evaporator includes opening a thermal energy valve, directing a thermal energy fluid from the thermal storage reservoir to the evaporator, transferring thermal energy from the thermal energy fluid to the evaporator, and directing the thermal energy fluid back to the thermal storage reservoir.

Aspect 5. The method of any one of aspects 1-4, wherein transferring thermal energy from the thermal storage reservoir to the evaporator includes defrosting an evaporator coil of the evaporator.

Aspect 6. The method of any one of aspects 1-5, wherein transferring thermal energy from the thermal storage reservoir to the evaporator includes heating the climate controlled space of the transport unit.

Aspect 7. The method of any one of aspects 1-6, further comprising:

determining whether a door opening event has occurred; and transferring thermal energy from the thermal storage reservoir to the evaporator when the door opening event has occurred and when the thermal energy charge of the thermal storage reservoir is greater than the charge threshold.

Aspect 8. The method of any one of aspects 1-7, further comprising:

monitoring an evaporator coil of the evaporator; and determining whether thermal energy should be transferred to the evaporator based on the monitoring of the evaporator coil of the evaporator.

Aspect 9. The method of aspect 8, wherein monitoring the evaporator coil of the evaporator includes monitoring at least one of evaporator coil temperature data and evaporator pressure data across the evaporator coil.

Aspect 10. A transport climate control system that provides climate control to a climate controlled space of a transport unit while in transit, the transport climate control system comprising:

a transport climate control circuit including:

a compressor that compresses a working fluid passing through the transport climate control circuit, a condenser that cools and condenses the working fluid, an expansion device that controls the amount of working fluid directed from the condenser to the evaporator, an evaporator that absorbs heat from the climate controlled space and evaporates the working fluid, and a thermal storage reservoir that stores thermal energy and is configured to direct the thermal energy to the evaporator;

a controller configured to control the transport climate control circuit and configured to:

determine whether the climate control circuit is operating in a start-stop cooling mode, determine a thermal energy charge of the thermal storage reservoir when the climate control circuit is operating in the start-stop cooling mode, determine whether the thermal energy charge is greater than a charge threshold, determine whether the climate control circuit is operating in a stop portion of the start-stop cooling mode when the thermal energy charge is greater than the charge threshold, and instruct the transport climate control circuit to transfer thermal energy from the thermal storage reservoir to the evaporator when the climate control circuit is operating in the stop portion of the start-stop cooling mode.

Aspect 11. The transport climate control system of aspect 10, where the controller is configured to charge the thermal storage reservoir when the climate control circuit is operating in the start portion of the start-stop cooling mode.

Aspect 12. The transport climate control system of any one of aspect 10 and 11, further comprising a heat capture valve configured to:

redirect the liquid working fluid travelling from the condenser to the expansion device to the thermal storage reservoir to allow the thermal storage reservoir to capture and store thermal energy from the liquid working fluid, and direct the liquid working fluid from the thermal storage reservoir to the expansion device.

Aspect 13. The transport climate control system of any one of aspects 10-12, further comprising a thermal energy valve configured to:
  direct a thermal energy fluid from the thermal storage reservoir to the evaporator, transfer thermal energy from the thermal energy fluid to the evaporator, and
  direct the thermal energy fluid back to the thermal storage reservoir.

Aspect 14. The transport climate control system of any one of aspects 10-13, wherein the controller is configured to:
  determine whether a door opening event has occurred; and
  instruct a transfer of thermal energy from the thermal storage reservoir to the evaporator when the controller determines that the door opening event has occurred and when the controller determines that the thermal energy charge of the thermal storage reservoir is greater than the charge threshold.

Aspect 15. The transport climate control system of any one of aspects 10-14, wherein the controller is configured to:
  monitor an evaporator coil of the evaporator; and
  determine whether thermal energy should be transferred to the evaporator based on the monitoring of the evaporator coil of the evaporator.

Aspect 16. The transport climate control system of aspect 15, wherein the controller is configured to monitor the evaporator coil of the evaporator by monitoring at least one of evaporator coil temperature data and evaporator pressure data across the evaporator coil.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, indicate the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts, without departing from the scope of the present disclosure. The word "embodiment" as used within this specification may, but does not necessarily, refer to the same embodiment. This specification and the embodiments described are examples only. Other and further embodiments may be devised without departing from the basic scope thereof, with the true scope and spirit of the disclosure being indicated by the claims that follow.

What is claimed is:

1. A method for directing thermal energy to an evaporator of a transport climate control circuit of a transport climate control system that provides climate control to a climate controlled space of a transport unit while in transit, the transport climate control circuit including a compressor, a condenser, an expansion valve, an evaporator and a thermal storage reservoir, the method comprising:
  a controller of the transport climate control system determining that the climate control circuit is operating in a start-stop cooling mode;
  determining that the climate control circuit is operating in a stop portion of the start-stop cooling mode;
  transferring thermal energy from the thermal storage reservoir to the evaporator upon determination that the climate control circuit is operating in the stop portion of the start-stop cooling mode;
  determining that the climate control circuit is operating in a start portion of the start-stop cooling mode;
  directing working fluid from the compressor to the condenser and from the condenser to the expansion valve upon determination that the climate control circuit is operating in the start portion of the start-stop cooling mode; and
  charging the thermal storage reservoir upon determination that the climate control circuit is operating in the start portion of the start-stop cooling mode, wherein charging the thermal storage reservoir includes redirecting a portion of the working fluid travelling from the condenser to the expansion valve towards the thermal storage reservoir and capturing and storing thermal energy from the portion of the working fluid within the thermal storage reservoir.

2. The method of claim 1, wherein charging the thermal storage reservoir further includes directing the portion of working fluid from the thermal storage reservoir to the expansion valve.

3. The method of claim 1, wherein transferring thermal energy from the thermal storage reservoir to the evaporator includes opening a thermal energy valve, directing a thermal energy fluid from the thermal storage reservoir to the evaporator, transferring thermal energy from the thermal energy fluid to the evaporator, and directing the thermal energy fluid back to the thermal storage reservoir.

4. The method of claim 1, wherein transferring thermal energy from the thermal storage reservoir to the evaporator includes defrosting an evaporator coil of the evaporator.

5. The method of claim 1, wherein transferring thermal energy from the thermal storage reservoir to the evaporator includes heating the climate controlled space of the transport unit.

6. The method of claim 1, further comprising:
  determining whether a door opening event has occurred; and
  transferring thermal energy from the thermal storage reservoir to the evaporator upon determination the door opening event has occurred and upon determination that the thermal energy charge of the thermal storage reservoir is greater than the charge threshold.

7. The method of claim 1, further comprising:
  monitoring an evaporator coil of the evaporator; and
  determining whether thermal energy should be transferred to the evaporator based on the monitoring of the evaporator coil of the evaporator.

8. The method of claim 7, wherein monitoring the evaporator coil of the evaporator includes monitoring at least one of evaporator coil temperature data and evaporator pressure data across the evaporator coil.

9. A transport climate control system that provides climate control to a climate controlled space of a transport unit while in transit, the transport climate control system comprising:
  a transport climate control circuit including:
    a compressor that compresses a working fluid passing through the transport climate control circuit,
    a condenser that cools and condenses the working fluid,
    an expansion valve that controls the amount of working fluid directed from the condenser to an evaporator,
    the evaporator that absorbs heat from the climate controlled space and evaporates the working fluid, and a thermal storage reservoir that stores thermal energy and is configured to direct the thermal energy to the evaporator;

a controller configured to control the transport climate control circuit and configured to:

determine whether the climate control circuit is operating in a start-stop cooling mode, determine whether the climate control circuit is operating in a stop portion or a start portion of the start-stop cooling mode when the climate control circuit is operating in a start-stop cooling mode, instruct the transport climate control circuit to transfer thermal energy from the thermal storage reservoir to the evaporator when the climate control circuit is operating in the stop portion of the start-stop cooling mode, instruct the climate control circuit to direct working fluid from the compressor to the condenser and from the condenser to the expansion valve when the climate control circuit is operating in the start portion of the start-stop cooling mode, and instruct the transport climate control circuit to charge the thermal storage reservoir when the climate control circuit is operating in the start portion of the start-stop cooling mode which includes instructing the transport climate control circuit to redirect a portion of the working fluid travelling from the condenser to the expansion valve towards the thermal storage reservoir to allow the thermal storage reservoir to capture and store thermal energy from the portion of the working fluid.

10. The transport climate control system of claim 9, further comprising a heat capture valve configured to:

direct the portion of working fluid from the thermal storage reservoir to the expansion valve.

11. The transport climate control system of claim 9, further comprising a thermal energy valve configured to:

direct a thermal energy fluid from the thermal storage reservoir to the evaporator, transfer thermal energy from the thermal energy fluid to the evaporator, and direct the thermal energy fluid back to the thermal storage reservoir.

12. The transport climate control system of claim 9, wherein the controller is configured to:

determine whether a door opening event has occurred; and instruct a transfer of thermal energy from the thermal storage reservoir to the evaporator when the controller determines that the door opening event has occurred and when the controller determines that the thermal energy charge of the thermal storage reservoir is greater than the charge threshold.

13. The transport climate control system of claim 9, wherein the controller is configured to:

monitor an evaporator coil of the evaporator; and determine whether thermal energy should be transferred to the evaporator based on the monitoring of the evaporator coil of the evaporator.

14. The transport climate control system of claim 13, wherein the controller is configured to monitor the evaporator coil of the evaporator by monitoring at least one of evaporator coil temperature data and evaporator pressure data across the evaporator coil.

15. The method of claim 1, further comprising directing the working fluid from the expansion valve to the evaporator, and from the evaporator back to the compressor upon determination that the climate control circuit is operating in the start portion of the start-stop cooling mode.

16. The method of claim 1, wherein transferring thermal energy from the thermal storage reservoir to the evaporator includes opening a thermal energy valve, directing a thermal energy fluid from the evaporator to the thermal storage reservoir, the thermal energy fluid retrieving the thermal energy stored in the thermal storage reservoir, and directing the thermal energy fluid back to the evaporator.

17. The transport climate control system of claim 9, wherein the controller is configured to instruct the transport climate control circuit to transfer thermal energy from the thermal storage reservoir to the evaporator includes the controller being configured to:

instruct a thermal energy valve to open, instruct the climate control circuit to direct a thermal energy fluid from the evaporator to the thermal storage reservoir to allow the thermal energy fluid to retrieve the thermal energy stored in the thermal storage reservoir, and to instruct the climate control circuit to direct the thermal energy fluid back to the evaporator.

18. A method for directing thermal energy to an evaporator of a transport climate control circuit of a transport climate control system that provides climate control to a climate controlled space of a transport unit while in transit, the transport climate control circuit including a compressor, a condenser, an expansion valve, an evaporator and a thermal storage reservoir, the method comprising:

a controller of the transport climate control system determining whether the climate control circuit is operating in a start-stop cooling mode;

the controller determining a thermal energy charge of the thermal storage reservoir when the climate control circuit is operating in the start-stop cooling mode;

determining whether the climate control circuit is operating in a stop portion of the start-stop cooling mode when the thermal energy charge is greater than the charge threshold;

transferring thermal energy from the thermal storage reservoir to the evaporator when the climate control circuit is operating in the stop portion of the start-stop cooling mode; and charging the thermal storage reservoir when the climate control circuit is operating in the start portion of the start-stop cooling mode, wherein charging the thermal storage reservoir includes opening a heat capture valve, redirecting liquid working fluid travelling from the condenser to the expansion device towards the thermal storage reservoir, capturing and storing thermal energy from the liquid working fluid within the thermal storage reservoir, and directing the liquid working fluid from the thermal storage reservoir to the expansion device.

* * * * *